United States Patent Office 3,366,622
Patented Jan. 30, 1968

3,366,622
OXIDATION OF HYDRAZOAMIDES TO
AZOFORMAMIDES
John Minton Challinor and Neil William Woodrow
Porter, Loughborough, England, assignors to Whiffen & Sons Limited, Loughborough, England
No Drawing. Filed July 27, 1965, Ser. No. 475,244
Claims priority, application Great Britain, Aug. 11, 1964,
32,761/64; Oct. 22, 1964, 43,045/64
10 Claims. (Cl. 260—192)

ABSTRACT OF THE DISCLOSURE

A process for the oxidation of an hydrazoamide, such as hydrazoformamide to azoformamide, in high yield without contamination by the starting material, which process comprises oxidizing the hydrazoamide with a water-soluble chlorate in an aqueous acidic medium having a pH in the range of 2.0 to 0.5 in the presence of a catalytic amount of bromide or bromine.

---

The present invention concerns an improved method for the oxidation of hydrazoamides.

The oxidation of hydrazoamides to azoamides presents various problems; it is generally desired to obtain the azoamide product free from hydrazoamide, and although it is possible to separate hydrazoamide from azoamide, this is not practicable commercially. However with many oxidation methods, if the oxidation is continued to complete oxidation, the product azoamide is also oxidised with loss of yield. Furthermore several oxidation methods, for example with dichromates, involve effluent disposal problems.

It has now surprisingly been found that hydrazoamides may be readily oxidised in high yields to the corresponding azoamides by oxidation with a water-soluble chlorate providing that the oxidation is carried out in the presence of high concentrations of hydrogen ion and in the presence of catalytic amounts of bromine or a bromide; by this process it is possible to obtain high yields of the azoamides free from the hydrazoamide starting material. This process involves minimal effluent problems.

Accordingly the present invention is for the oxidation of hydrazoamides of the formula:

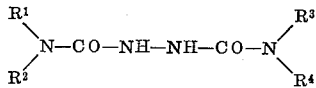

where $R^1$, $R^2$, $R^3$ and $R^4$ are selected from the groups comprising hydrogen, alkyl, cycloalkyl, aryl and aralkyl groups, substituted or unsubstituted, to the corresponding azoamide, by treatment with a water-soluble chlorate in an acidic medium having a pH as herein defined in the range −2.0 to −0.5 in the presence of bromine or a bromide. The pH is preferably in the range −1.0 to 0.5.

In the above formula $R^1$, $R^2$, $R^3$ and $R^4$ may each be the same or different. Where $R^1$, $R^2$, $R^3$ and $R^4$ are alkyl, cycloalkyl, aryl or aralkyl groups, these may be substituted or unsubstituted. Where substituted, the substituent groups may comprise for example chloro or nitro groups. However it is preferred that these groups should be unsubstituted.

According to one embodiment of the invention, in the formula above, $R^1$, $R^2$, $R^3$ and $R^4$ are the same or different and are selected from hydrogen, alkyl (for example alkyl with from 1–12 carbon atoms, such as n-propyl, isobutyl, octyl and dodecyl, but preferably methyl and ethyl), cycloalkyl (such as cyclopentyl and cyclohexyl), aryl (such as ethylphenyl and naphthyl, but preferably phenyl) and aralkyl having from 1–5 carbon atoms in the alkyl chain (for example naphthyl ethyl, but preferably benzyl) groups.

Acording to a preferred embodiment of the invention $R^1$, $R^2$, $R^3$ and $R^4$ are each hydrogen.

The bromine or bromide may be present in amounts varying over a wide range, but essentially only requires to be present in catalytic amounts. The amount of bromine or bromide suitably comprises from 0.1 to 20% by weight based on the hydrazoamide starting material, and preferably comprises 1 to 10% by weight on the hydrazoamide starting material. Bromides which may be mentioned include alkali metal bromides, such as for example sodium bromide and potassium bromide, alkaline earth metal bromides, such as for example calcium bromide and barium bromide; other metal bromides such as for example ferric bromide, chromic bromide, copper bromide, strontium bromide, cobaltic bromide and zinc bromide; hydrobromic acid; and halogenobromides such as bromine monochloride. Similarly the bromide may be an organic bromide such as a quaternary ammonium bromide such as tetramethylammonium bromide or tetraethylammonium bromide.

The concentration of bromide or bromine in the total reaction liquor is suitably in excess of 0.01% weight/volume, and is preferably in the range 0.5 to 10% weight/volume. The weight/volume ratio is calculated as grams/cubic centimetre.

By the term pH as used in the specification and claims is meant pH calculated according to the formula $$\mathrm{pH} = -\log_{10} (\text{hydrogen ion concentration})$$

wherein monobasic acids (such as hydrochloric acid) are assumed to be fully ionised and polybasic acids (such as sulphuric acid) are assumed to have the first hydrogen atom fully ionised and the other hydrogen atom(s) non-ionised.

It is preferred to carry out the process in the presence of hydrochloric acid or sulphuric acid or a mixture thereof; other acids such as phosphoric acid may be used if desired, but oxidising acids such as nitric acid are unsuitable.

During the process, there is an increasing dilution as some water is formed in the oxidation process, and in many cases the chlorate is added as an aqueous solution. Consequently the acidity at the end of the oxidation is more significant than the acidity at the beginning of the reaction. It is preferred to carry out the process with the pH in the range −0.5 to −1.0 throughout the reaction.

The water soluble chlorate may be for example an alkali metal chlorate such as potassium chlorate or sodium chlorate; an alkaline earth metal chlorate such as calcium chlorate; and other metal chlorates such as magnesium chlorate, zinc chlorate, lead chlorate or silver chlorate. However it is essential to use a metal which forms a soluble salt of the acid employed, as otherwise the product is contaminated with the insoluble metal salt. It is preferred to use an alkali metal chlorate, specifically sodium chlorate, which is also the cheapest available chlorate. The chlorate may be added to the reaction mixture in the form of a solution in water or may be added as a solid, whichever is found most convenient.

The amount of chlorate used in the oxidation must be at least the stoichiometric equivalent amount if complete oxidation is to be obtained.

The present invention is particularly concerned with the oxidation of hydrazoformamide to azoformamide, which is used widely as a blowing agent. For this purpose the azoformamide requires to be completely free from hydrazoformamide, and it is a special feature of the invention that the present process provides a simple method for the oxidation of hydrazoformamide to azoformamide in high yields giving a product free from hydrazoformamide. In order to obtain this result, an excess of chlorate over the stoichiometric amount is required; the excess may be up to 100% or more over this amount, although such large excesses are not strictly required for the process. Satisfactory results are obtained with up to 15% excess over the stoichiometric amount; it is preferred to use a 5–10% excess over this amount.

The present invention provides a method of obtaining very high yields of azoformamide free from hydrazoformamide. In other oxidation processes, complete oxidation may only be obtainable in reduced yields, as the conditions to obtain complete oxidation lead to decomposition of the azoformamide product.

The oxidation may be carried out at elevated temperatures desirably in excess of 25° C. Temperatures in excess of 75° C. may be used, if desired, but less satisfactory results are obtained generally. It is preferred to carry out the reaction at temperatures in the range about 25–50° C.

The oxidation may be carried out under atmospheric pressure, reduced pressure or elevated pressure.

The following examples, in which percentages are by weight, illustrate the process of the present invention.

Example 1

A solution containing 30.9 grams of sodium chlorate in 50 millilitres of water was added over 37.5 minutes to a stirred suspension containing 100 grams of hydrazoformamide, 110 millilitres of 36% hydrochloric acid in 70 millilitres of water and 3.75 grams of sodium bromide. The reaction temperature was maintained at 37.5° C.; the pH at the start of the process was −0.85 and at the finish of the process was −0.75. 96.5 grams of an orange azoformamide were obtained, which was washed, filtered and dried. The azoformamide contained no detectable quantity of hydrazoformamide.

Example 2

A solution containing 35 grams of calcium chlorate in 50 millilitres of water was added over 40 minutes to a stirred suspension containing 100 grams of hydrazoformamide, 113 millilitres of 36% hydrochloric acid in 72 millilitres of water and 4.5 grams of potassium bromide. The reaction temperature was maintained at 40° C.; the pH at the start of the process was −0.85 and at the finish of the process was −0.75. 96 grams of azoformamide were obtained, which was washed, filtered and dried. The azoformamide contained no detectable quantity of hydrazoformamide.

Example 3

A solution containing 32 grams sodium chlorate in 45 millilitres of aqueous solution was added over 45 minutes to a stirred suspension containing 100 grams of hydrazoformamide, 61 millilitres of 36% hydrochloric acid in 59 millilitres of water, and 0.5 gram sodium bromide. The reaction temperature was maintained at 40–45°; the pH at the start of the process was −0.77 and at the finish of the process was −0.63. The azoformamide product (96 grams) was filtered, washed and dried, and contained no detectable quantity of hydrazoformamide.

Example 4

A solution containing 33 grams sodium chlorate in 80 millilitres of aqueous solution was added over 45 minutes to a stirred suspension containing 100 grams of hydrazoformamide, 71.5 grams of concentrated sulphuric acid in 94 millilitres of water and 0.5 gram of sodium bromide. The reaction temperature was maintained at 40–45°; the pH at the start of the process was −1.04 and at the finish of the process was −0.83. The azoformamide product (97 grams) was filtered, washed and dried, and was found to contain no detectable quantity of hydrazoformamide.

Example 5

The process of Example 3 was repeated exactly as described, but carried out at a temperature of 50–55° C. 94 grams of azoformamide were obtained.

Example 6

The process of Example 3 was repeated exactly as described but carried out at a temperature of 60–65° C. 91 grams of azoformamide were obtained, containing no detectable amount of hydrazoformamide.

Example 7

32 grams of solid sodium chlorate was added in portions over 45 minutes to a stirred suspension containing 100 grams of hydrazoformamide, 61 millilitres of 36% hydrochloric acid in 81 millilitres of water, and 0.5 gram of bromine. The reaction temperature was maintained at 40–45°; the pH at the start of the process was −0.70 and at the finish of the process was −0.65. The azoformamide product (96 grams) was filtered, washed and dried. This was found to contain no detectable amount of hydrazoformamide.

Example 8

32 grams solid sodium chlorate was added in portions over 45 minutes to a stirred suspension containing 100 grams hydrazoformamide, 60 grams concentrated sulphuric acid in 94 millilitres of water and 1.0 gram of cobalt bromide. The reaction temperature was maintained at 40–45°; the pH at the start of the process was −0.78 and at the finish of the process was −0.74. The azoformamide product (97 grams) was filtered, washed and dried and was found to contain no detectable amount of hydrazoformamide.

Example 9

The process of Example 3 was repeated exactly as described replacing the hydrazoformamide by methylhydrazoformamide. 92 parts of monomethylazoformamide were obtained.

Example 10

The process of Example 3 was repeated exactly as described replacing the hydrazoformamide by N-methyl-N-phenylhydrazoformamide. 82 parts of N-methyl-N-phenylazoformamide were obtained.

Example 11

The process of Example 3 was repeated exactly as described replacing the hydrazoformamide by N-ethyl-N-phenyl-N′-methylhydrazoformamide. 96 parts of N-ethyl-N-phenyl-N′-methyldrazoformamide were obtained.

Example 12

The process of Example 3 was repeated exactly as described replacing the hydrazoformamide by N,N,N′,N′-tetrabenzylhydrazoformamide. 92 parts of N,N,N′,N′-tetrabenzylazoformamide were obtained.

Example 13

The process of Example 3 was repeated exactly as described replacing the hydrazoformamide by N-methyl-N-phenyl - N′ - benzyl - N′ - (7 - ethylnaphthyl)hydrazoformamide. 88 parts of N-methyl-N-phenyl-N′-benzyl-N′-(7-ethylnaphthyl) azoformamide were obtained.

Example 14

The process of Example 3 was repeated exactly as described replacing the hydrazoformamide by N,N - dimethyl - N′ - cyclohexyl - N′ - n - dodecyl - hydrazoformamide. 85 parts of N,N-dimethyl-N′-cyclohexyl-N′-n-dodecyl-azoformamide were obtained.

We claim:

1. A process for the oxidation of hydrazoamides of the formula:

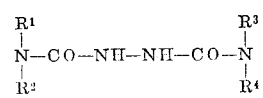

where $R^1$, $R^2$, $R^3$, and $R^4$ are selected from the group consisting of hydrogen, alkyl, cycloalkyl, aryl and aralkyl groups, and the chloro and nitro-substituents thereof to the corresponding azoamide which comprises treating the hydrazoamide with a water soluble chlorate in an aqueous acidic medium having a pH in the range of −2.0 to −0.5 in the presence of a compound selected from the group consisting of bromine and bromides.

2. A process as claimed in claim 1 wherein $R^1$, $R^2$, $R^3$ and $R^4$ are each hydrogen.

3. A process as claimed in claim 1 wherein the chlorate is sodium chlorate.

4. A process as claimed in claim 1 wherein the bromine or bromide is present in amount comprising 0.1 to 20% by weight of the hydrazoamide starting material.

5. A process as claimed in claim 1 wherein the concentration of the bromine compound in the reaction medium is in excess of 0.01% weight/volume.

6. A process as claimed in claim 1 wherein the oxidation is carried out at a temperature in the range 25° to 50° C.

7. A process as claimed in claim 1 wherein the pH of the reaction medium is in the range of −0.5 to −1.0 throughout the reaction.

8. A process as claimed in claim 1 wherein the chlorate is used in amount comprising 5–10% excess over the stoichiometric amount.

9. A process as claimed in claim 1 wherein the bromide is selected from the group consisting of halogenobromides, hydrobromic acid, alkali metal bromides, alkaline earth metal bromides, ferric bromide, chromic bromide, copper bromide, strontium bromide, cobaltic bromide, zinc bromide and quaternary ammonium bromide.

10. A process for the production of azoformamide which comprises oxidising hydrabroamide by treatment with sodium chlorate in an aqueous acidic medium containing an acid selected from the group consisting of hydrochloric acid and sulphuric acid, at a pH below 0, in the presence of a compound selected from the group consisting of bromine and bromides in amount comprising 0.1 to 20% by weight of the hydrazoformamide starting material and in a concentration in excess of 0.01% weight/volume.

References Cited

UNITED STATES PATENTS 3,190,873    6/1965    Porter _____ 260—192

FOREIGN PATENTS 959,761    6/1964    Great Britain.
1,344,799    10/1963    France.
22,567    10/1963    Japan.

FLOYD D. HIGEL, *Primary Examiner.*